United States Patent [19]

Bachhofer et al.

[11] 4,053,403

[45] Oct. 11, 1977

[54] METHOD OF TREATING AND DEGERMINATING BATH WATER, PARTICULARLY BATH WATER CONTAMINATED BY THE GERM BACT. PSEUDOMONAS PYOCANEA, IN MEDICAL TUB-BATHS AND UNDERWATER MASSAGE BATHS

[76] Inventors: Bruno Bachhofer, Santisstrasse 85, 7981 Bavendorf; Anton Locher, Bergstrasse 6, 7981 Torkenweiler; Gerhard Skirde, Trelder Dorfstrasse, 2110 Buchholz-Trelde; Hansjörg Quistorff, Babendiekstrasse 17, 2000 Hamburg-Blankenese, all of Germany

[21] Appl. No.: 666,485

[22] Filed: Mar. 12, 1976

[30] Foreign Application Priority Data

Mar. 15, 1975 Germany .............................. 2511499
Feb. 20, 1976 Germany .............................. 2606838

[51] Int. Cl.² ................................ C02B 1/38; C02C 5/02
[52] U.S. Cl. ....................................... 210/62; 210/63 Z; 210/64
[58] Field of Search ............................ 210/63 Z, 62, 64; 204/176; 21/54 R

[56] References Cited

U.S. PATENT DOCUMENTS

| 897,039 | 8/1908 | Vogelsong | 210/63 Z |
| 2,580,809 | 1/1952 | Marks et al. | 210/63 Z |
| 2,771,416 | 11/1956 | Ryan | 210/63 Z |

FOREIGN PATENT DOCUMENTS

| 656,544 | 1/1965 | Belgium | 210/63 Z |
| 2,156,571 | 5/1973 | Germany | 210/63 Z |
| 2,012,895 | 10/1971 | Germany | 210/63 Z |

*Primary Examiner*—Thomas G. Wyse
*Attorney, Agent, or Firm*—Toren, McGeady and Stanger

[57] ABSTRACT

A bath water treating system in which even highly resistant germs may be destroyed by treating the bath water with ozone and a halogen compound such as bromine or hydrobromic acid to establish a redox potential in excess of 600 mV. The bath water is recycled through a quartz type filter loaded with a composite filtering medium. The filtering medium comprises two superposed layers, a lower layer consisting of a mixture of filter gravel and mineralized charcoal, and an upper layer of activated charcoal. A halogen or halogen compound is absorbed in the charcoal layer. An ozone generator is mounted within the filter housing. The bathtub assembly comprises a cabinet in which are mounted a bath-tub, a filtering and degerminating unit and the respective accessories and controls. The ozonizer is removably mounted within the filter housing and includes a mixing chamber and check valves.

1 Claim, 5 Drawing Figures

Fig. 3

METHOD OF TREATING AND DEGERMINATING BATH WATER, PARTICULARLY BATH WATER CONTAMINATED BY THE GERM BACT. PSEUDOMONAS PYOCANEA, IN MEDICAL TUB-BATHS AND UNDERWATER MASSAGE BATHS

The present invention relates to a method of treating and degerminating bath water, particularly bath water contaminated by the germ bacteria *pseudomonas pyocyanea*, in medical tub-baths and underwater massage baths.

The problems associated with the multiple usage of the bath water in large-sized bath-tubs for medical bath treatment cannot be solved satisfactorily by heretofore known apparatus. This deficiency may be attributed to the fact that the water in bath-tubs employed for therapeutical treatments tends to become more strongly contaminated than for example the water of public swimming pools. In medical baths the contamination of the bath water caused by a single bathing person is generally considered to be increased by a factor of 4 over the values encountered in public swimming pools. Additionally, underwater massage treatment by water jets causes a fulling of the patient's skin, with the result of an increased scaling off of epithelial tissues. The water jets likewise set free more bacteria that may be lodged in pores of the skin and at hair root openings and at many other locations across the surface of the skin. Another factor is that therapeutical bath treatment is predominantly carried out in hospitals and on bed patients so that the aspects of success of bath water purification and disinfecting treatment appear to be rather vague. It is generally known that with an increased period of stay in a hospital the germ flora of a patient's skin is greatly increased or respectively modified. Apathogenic germs may be displaced in certain skin regions by pathogenic germs, without leading to an infection. With the multiple usage of bath water, these germs may become infectious and therefore constitute a potential risk to the patients who subsequently use the same bath water.

Various types of heretofore known water treatment plants allow the purification of bath water to a degree at which multiple bath water usage appears possible. In heretofore known water treatment devices for underwater jet massage bath tubs the filter medium consists of diatomaceous earth. Filters of this type, however, remove only relatively coarse impurities from the water. The disinfection of water by chlorine additives in combination with filters of this type may only be achieved by adding a much higher quantitity of chlorine than for example in public baths. Neither the patients nor the attendants may be expected to put up with high chlorine concentrations. The addition of quaternary ammonium compounds as a disinfectant is out of the question because quaternary ammonium compounds lead to excessive foaming in underwater massages by water jets. Another reason is that quaternary ammonium compounds may not be employed in combination with diatomaceous earth filters.

A complete disinfection of the bathing water in medical baths is in many cases not possible because the water is quite often mixed with substances that are intended to improve upon the therapeutical effects. When employing chlorine, the amount of disinfectant used is dependent upon the quantity of organic matter contained in the water. Therefore the disinfection cannot be obtained by chlorine for the above stated reasons. When emloying a low chlorine concentration, this low concentration will be insufficient for destroying certain types of germs. Furthermore it has to be considered that the addition of chlorine necessarily requires precise metering of the actual amounts of chlorine added so that expensive and complicated chlorine metering devices must be used.

In contrast to conventional swimming pools, a massage bath is characterized by a rather small body of water of e.g. 400 liters (106 gallons), and this small body of water must be recycled once every 3 to 4 minutes. Another drawback in a massage bath is the excessive germ input, due to the facts that the patients are mostly of high age, sick or bedridden and the hard massaging water jet detaches more skin particles and may also enter body orifices. Heretofore known water treatment plants allow to arrive at only partly degerminated conditions. A particularly resistent germ is the germ bact. *pseudomonas pyocyanea* which is particularly dreaded. This germ comprises a gel envelope and is therefore highly resistant. Heretofore known water treatment plants are ineffective in removing this germ from bath water. This germ thrives particularly well in oxygen rich environments. With heretofore known water treatment plants, there will always be encountered very high germ numbers. The presently considered permissible threshold level for germ numbers is 120 germs per cubic centimeter in medical baths.

It is, therefore, the object of the present invention to provide a method of treating and degerminating bath water, particularly bath water contaminated by the germ bact. *pseudomonas pyocyanea*, in medical tub-baths and underwater massage baths, which method allows to arrive at germ numbers zero in medical baths, and to eliminate any germs of the highly resistent germ bact. *pseudomonas pyocyanea*.

In accordance with the present invention, there is now proposed a method of treating and degerminating bath water comprising the steps of continuously passing the bath water containing contaminations and germs through a two-layer filter assembly charged with bromine or hydrobromic acid respectively, the filter assembly including an inferior layer consisting of a mixture of filter gravel and mineralized charcoal, and a superior layer consisting of fine grain activated charcoal, charging the bath water in an ozonizer disposed in an inlet region of said filter assembly with an ozone-containing gas whereby the bath water is utilized as a coolant for the ozonizer and is heated by the reaction heat produced by the ozonizer.

By ozonizing the bath water and adding bromine or hydrobromic acid respectively, the redox potential may be increased to more than 650 millivolts, i.e. to provide a degerminating activity at which may be obtained germ numbers of zero, i.e. degerminated water.

For degerminating the bath water it will be sufficient to add once only an excess of hydrobromic acid such as for example one liter of 43% hydrobromic acid on 20 vol. liters of activated charcoal in the filter assembly. The charcoal filter readily absorbs almost all of the bromine very quickly within fine capillaries and cracks of the filter charcoal granules. Surprisingly it was found that the large amount of bromine added initially "disappears" but there will remain a sufficient supply of oxidizing bromine in the water process stream in order to sustain a redox potential between 600 to 700 millivolts, and to eliminate the resistent germ bact. *pseudomonas pyocyanea*.

The charging of the charcoal filter with bromine or hydrobromic acid respectively may somehow be considered equivalent to establishing a bromine depot by a chemical mechanism more or less as follows: Subsequently to a bath treatment of a patient liable to germ input the bath water is purified until urea and the like contaminations are no longer present in the water. By continuously discharging ozone gas into the water the available bromine is oxidized. This process continues until an excess of ozone commences to be formed. At this stage, the ozone reacts with the activated charcoal in forming carbon dioxide. Thus carbon is actually burnt whereby more bromine of the bromine supply in the charcoal is released, and this constitutes the decisive effect. The bromine encapsulated in colloidal matter and flushed out during the daily filter backwashing operation and the bromine contained in the water are removed together with the water when discharging the bath water filling and replacing the same by a fresh water filling will continuously be replaced by fresh bromine.

The method of the present invention allows in normal massage bath service to relatively quickly reestablish a desired level of about 650 millivolts for the redox potential each time a patient has left the bath-tub. When reaching this level of potential, water samples taken are germ-free. As an advantageous effect, the activated charcoal contributes to avoiding an excess of ozone in the bath water. This is highly desired and required since the maximum level of ozone in the water of medical baths may not exceed 0.1 PPM, and the maximum level of ozone in the air above the water or within the room may not exceeed 0.01 PPM. When finishing the daily bath program, the plant should be deactivated, in order to avoid unnecessary combustion of the charcoal filter and thereby the release of more bromine than is actually being required.

It was found to be particularly advantageous to employ a filter assembly including an inferior filter layer consisting of an intimate mixture of filter gravel in a grain size range from 0.3 to 0.7 mms, and 25 volume liters of mineralized charcoal of a reduced chemical activity such as the product known by the trade name Hydro-Anthrasit A. The superior filter layer may consist of 20 volume liters of a fine grain highly active activated charcoal such as the product known by the trade name Hydraffin LW.

By feeding an ozone-containing gas into the recycled bath water and employing a bromine-charged filter there will not be required any automatic metering devices for bromine or other chemicals. By this fact there are avoided all risks of adding chemicals at the wrong time or at an inappropriate ratio.

Since the recycled bath water is used simultaneously as a coolant for the ozonizer that is disposed within the filter assembly, the bathing water may be kept continuously at a certain temperature because the reaction heat generated by the ozonizer maintains the bathing water at the desired temperature over extended periods so that no separate heating circuit is required and heating costs are saved.

The invention furthermore provides a bath-tub assembly which is adapted particularly for medical bath applications such as tub-baths and underwater massage bath treatments. This bath tub assembly includes a bath water treating and degerminating assembly adapted particularly to remove the germ bact. pseudomonas pyocyanea from the bath water. In a cabinet are mounted a bath tub body and a filter assembly. The filter assembly includes a filter housing with a two-layer filtering medium. The filtering medium is charged with bromine or hydrobromic acid respectively and comprises a first inferior layer of a mixture of filter gravel and mineralized charcoal, and a second superior layer consisting of fine grain activated charcoal. A feed line connects a lower portion of the filter housing with the bath tub. A return line connects an upper portion of the filter housing with the bath tub. A circulating pump is connected in the return line. An ozonizer disposed within the filter housing above the filtering medium contacts at its outer surface the bath water circulated through the filter housing whereby the ozonizer is efficiently cooled. On the ozonizer is mounted a mixing assembly with a nozzle head, and this assembly is connected to the water feed line.

The in-line ozonizer which forms an integral part of the treating and degerminating assembly eliminates the need for extended ozone transport paths and allows direct mixing of the ozone-containing gas at a maximum ozone concentration with the water whereby mixing takes place in an area which is highly suitable for injector type mixing. The ozonizer likewise does not require any specific cooling devices. All of the process heat generated within the ozonizer will be tramsmitted directly to the recycled bath water with an attendant saving in heating costs. The proposed water treating and degerminating assembly may be installed together with the bath tub body within a suitable cabinet whereby all parts of the assembly may already be mounted on an assembly line. All of the controls, mechanisms, monitoring devices and the like required for operation are installed and connected within the cabinet. The overall assembly therefore constitutes a self-contained water treatment plant including all of the required accessories. The treatment plant has minimum space requirements, is highly reliable, needs little maintenance and yields a high ozone output.

The ozonizer may include a plurality of outer electrodes in the form of solid cup-shaped annular discs of a heat conductive material, a plurality of annular discs of a ceramic material serving as dielectrics and a plurality of inner electrodes in the form of sheet metal discs. The outer and inner electrodes and the dielectric discs are stacked in a rigid compound. Between the ceramic discs and the inner electrodes are formed a plurality of discharge spaces permitting air flow in opposite radial directions alternately inwardly, i.e. toward the center or axis of the assembly, and outwardly, i.e. away from the axis.

The inner electrodes are spaced from the ceramic discs by a plurality of intermediate small spacer members made of a resilient material and disposed in the space between adjacent facing surfaces of the electrodes and the ceramic discs. The inner electrodes are centered by centrally arranged plug-and-socket type mating members. A high voltage bushing insulator with a gas inlet conduit and a gas line connector is arranged at one end of the ozonizer, and the nozzle head is arranged at the opposite end of the ozonizer.

A heretofore known ozonizer of a similar design is disclosed in the German Pat. No. 1,176,100. In this prior art ozonizer, the inner electrodes are mounted at their periphery. In contrast thereto, the ozonizer of the present invention is of a much simpler design, and the gas flow may be effected free of turbulence at the edge of the inner electrodes. The bushing insulator is mounted at one end of the ozonizer, and this ozonizer end concurrently defines a wall portion of the filter housing. This arrangement allows safe wiring between the high voltage source and the inner electrodes, and a convenient gas inlet connection. The nozzle head which is mounted at the opposite end of the ozonizer discharges the ozone-containing gas directly into the water surrounding the ozonizer which is thereby cooled.

In ready-to-plug-in water treatment plants for smaller size bath tubs it is advantageous to mount the ozonizer directly within the filter housing having as a filtering medium for example gravel. In this case, the ozonizer may be suspended from a horizontal cover plate of the filter housing, with the center line of the ozonizer being disposed vertically, the air feed line and a high voltage lead being connected to the upper end of the ozonizer, the nozzle head being connected to the bottom end of the ozonizer, and the water feed line extends through the filter housing cover plate at a location laterally spaced from the ozonizer, and a feed line portion inwardly of the cover plate being connected by a 180° connector to the lower end of the nozzle head. With such an arrangement, all parts are mounted at the cover plate of the housing and may be readily removed from the housing. The feed line extends into the housing up to the nozzle head, i.e. to a point at which the mixing of gas and water may be achieved most conveniently.

For avoiding the entry of water into the ozonizer, there may be connected a check valve assembly between the internal cavity of the ozonizer and the nozzle head. The details of a particularly advantageous embodiment of such a check valve assembly are described further below. Apart from design details the present invention in principle proposes, in accordance with an important aspect thereof, to mount the check valve assembly and the nozzle head within a flow director body extending into the water feed line in a direction opposite the water feed direction, that the outer surface of the flow director body is shaped to define in combination with an outer member an upstream neck portion and a downstream annular space of a gradually increasing cross sectional area in the flow direction, and the nozzle orifices of the nozzle head open into the annular spaced in the vicinity of the narrowest cross sectional area. By an arrangement of this type may be achieved the well known injector effect. The negative pressure generated within the feed water path favors the entry of the ozone-containing gas into the water flow and the formation of a well mixed gas water emulsion. The forming of this emulsion is favored by high flow speeds and the reaction of the ozone with the substances contained in the water.

For further intensifying this mixing step, the invention furthermore proposes that the ozonizer includes at its lower end a bottom plate on which is mounted the nozzle head, a mixing trough connected to the lower end of the ozonizer, the mixing trough including a bottom wall spaced from and extending parallel to the bottom plate of the ozonizer, and a plurality of coaxially disposed apertured cylindrical baffles extending from the ozonizer bottom plate to the mixing trough bottom wall. The gas water mixture flowing in a radial outward direction has to pass through several baffles which are arranged one behind the other. These baffles consist of several coaxially arranged cylindrical tube sections having alternately upper and lower marginal cut-outs through which the water gas mixture may pass so that this mixture is deflected several times and further turbulences are produced. From the outermost mixing chamber the water gas mixture is discharged into the filter housing and sweeps along the outer surface of the ozonizer.

In accordance with another feature of the present invention, the check valve assembly may comprise a diaphragm valve and downstream thereof a ball valve mounted in a central aperture of the diaphragm valve. Simple check valves do not close tightly at the moment of flow reversal. On the other hand it must be safely prevented that even traces of water may enter the ozonizer. This is being ensured by the above proposal. Despite of a high spring bias and the thereby ensured safe seal at the seat of the diaphragm valve this valve is effectively prevented from oscillating and stays in an open position even during pressure variations. This operation is due to the fact that the residual force exerted by the downstream ball valve mounted in the diaphragm valve resulting from the difference in aperture pressures is sufficiently high.

In accordance with a particularly suitable embodiment of a check valve assembly, the check valve assembly includes an elongate valve member having a longitudinal axial bore, a spring-biased ball valve mounted in the valve member, a guide bore in the flow director body and an annular diaphragm for translationally guiding the valve member, one end of the valve member axial bore defining an orifice portion, a spring engaging the valve member and urging the orifice portion against a sealing closure disc, and an abutment surface for delimiting the movements of the annular diaphragm in the opposite direction. An assembly of this type may readily be accommodated within a cone-shaped flow director body so that the diaphragm would be adjacent the cone base, the valve member with the ball valve is located between the diaphragm and the apex of the cone, and the apex of the cone defines the nozzle head. The check valve assembly preferably consists of a replaceable assembly that is screw-mounted to one face of the ozonizer.

If it is desired to vary the negative pressure in the region in which the ozonized gas is being discharged into the water, then the outer member surrounding the flow director body and defining in combination with the same a neck portion in the flow conduit connected to the water supply line may be axially adjustable with respect to the flow director body. This arrangement is likewise advantageous insofar as one and the same flow director body may be used in water treatment plants of different capacities and the flow cross sectional areas may be adapted to individual plants and local water supply pressures.

In the following, the present invention will be described more in detail with reference to a preferred embodiment shown in the appended drawings wherein.

Figure 1:
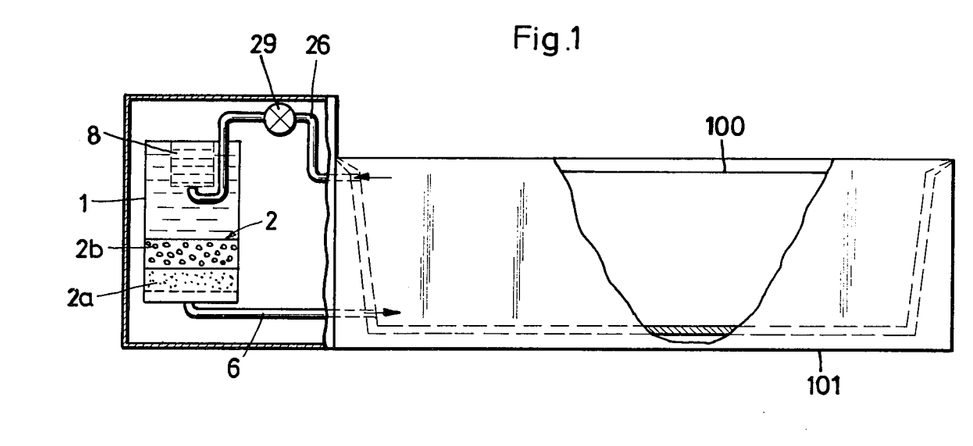
FIG 1 is a schematical lateral view, partly in elevation and partly in section of a bath tub assembly for medical baths with integrated water treating and degerminating plant.

As shown in FIG. 1, the bath tube assembly of the present invention for medical bath treatment includes a bath tub body 100 and a bath water treating and degerminating assembly 1 with an ozone generator or ozonizer 8, these parts being accommodated within a cabinet 101. The bath tub body 100 is connected in an upper region by an outlet line 26 to the bath water treating and degerminating assembly 1. In the outlet line 26 is connected a circulating pump 29. The bath water treating and degerminating assembly 1 is connected by a feed line 6 to a lower region of the bath tub body 100. The assembly 1 includes the ozonizer indicated generally by reference numeral 8.

Figure 2:
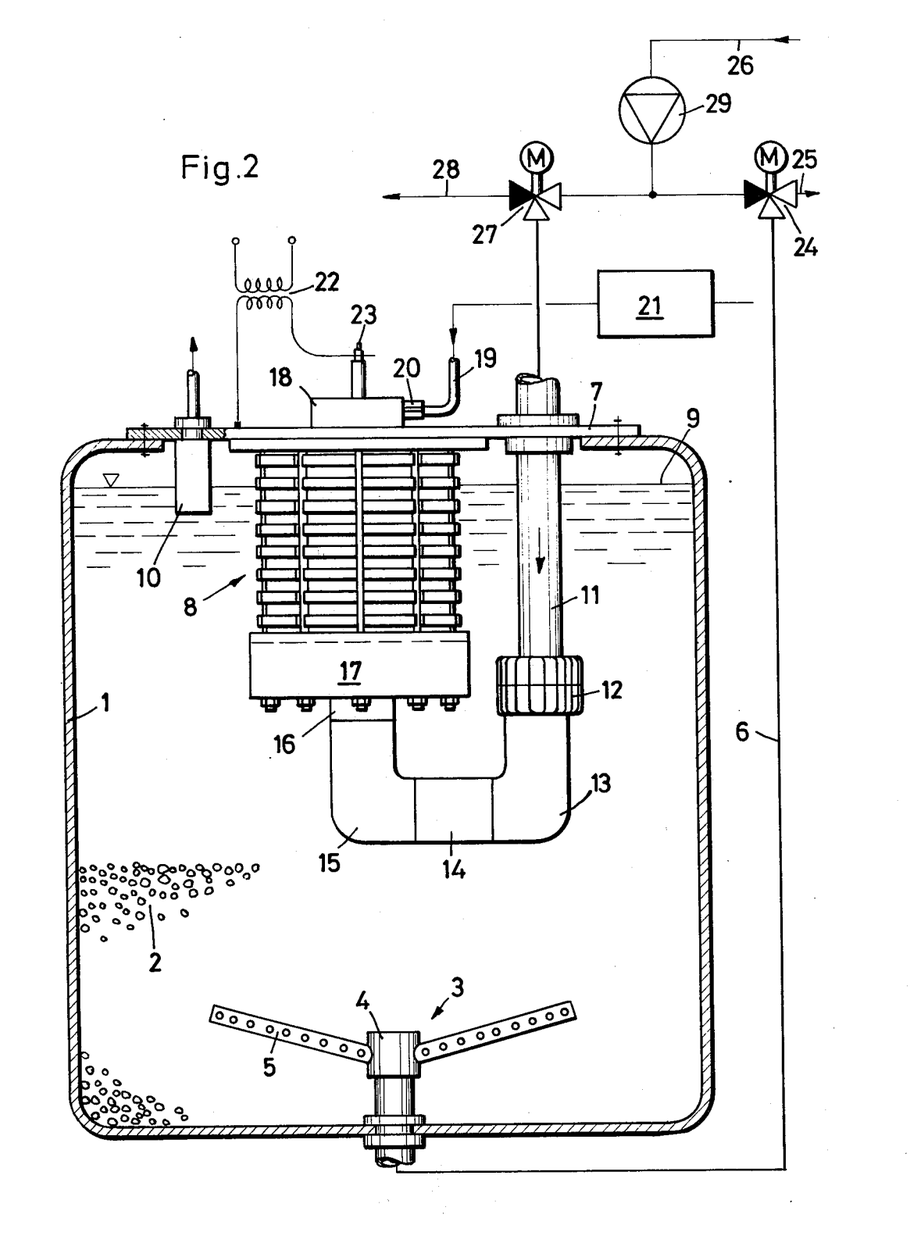
FIG. 2 is a schematical overall view of a bath water treating assembly, a gravel filter and an ozonizer mounted within the filter housing.

Referring to FIG. 2, the assembly 1 for treating and degerminating bath water includes a filter housing 1' defining an internal cavity about half of which is filled with quartz gravel 2. Within the quartz gravel filling is embedded a so-called filter star 3. This filter star 3 consists of a central manifold 4 with several radially projecting tube sections 5 in a star-shaped configuration. The tube sections 5 are closed at their free outer ends and include a large number of small bores. The manifold 4 is connected to the feed line 6 which extends through the bottom of the filter housing 1'. At its upper end, the filter housing 1' is closed by a flat cover plate 7 to the inner surface of which is mounted the ozonizer 8 so that the major portion of the latter is submerged in the water. The ozonizer 8 consists of an assembly of annular discs. The upper surface of the water level 9 as shown may be controlled by means of a vent valve 10. The vent valve 10 includes a float which opens the valve when the water level drops and closes the valve when the water level rises beyond the set level.

The filter 2 consists of two different layers. An inferior layer 2a consists of a mixture of filter gravel and mineralized charcoal of a reduced activity, whereas the superior layer 2b consists of fine grain activated charcoal. The filter 2 is charged with bromine or hydrobromic acid respectively. The filter 2 is mixed only once with an excess of hydrobromic acid, e.g. 1 liter of 43% hydrobromic acid on 20 volume liters of activated charcoal in the filter. This ratio magnitude is important. The charcoal filter readily absorbs almost all of the bromine whereby the bromine enters into the fine capillaries and cracks of the charcoal grains. The large amounts of bromine absorbed by the filter cannot become effective; there will remain enough potentially oxidating bromine in the circuit to sustain a redox potential of between 600 to 700 millivolts at which complete degermination is effected.

The diameter of the filter housing 1' may preferably be selected at 450 mms, and the capacity of the housing at about 150 liters. The inferior layer 2a consists of an intimate mixture of 50 volume liters of filter gravel in a grain range from 0.3 to 0.7 mms and 25 volume liters of a product known by the trade name Hydro-Anthrasit A which is a mineralized charcoal of reduced chemical activity. The superior filter layer 2a consists of 20 volume liters of a product known by the trade name Hydraffin LW which is a fine grain highly efficient activated charcoal. The bromine depot which is provided initially by adding a sufficient quantity of hydrobromic acid will be effective for about 500 bath tub charges. Assuming that the bath tub is filled with fresh water daily, this original bromine depot will cover the bromine requirements for a full calendar year, at a very high safety factor. Tests have shown, however, that more bromine is required since 10 kg of activated charcoal have the capacity of absorbing 7.5 kg of iodine. The absorbance for bromine is in the same order of magnitude as for iodine.

A feed line section 11 is mounted in the cover plate 7 and sealed thereagainst. The free end of the feed line section 11 disposed within the internal cavity of the filter housing 1' is provided with a quick-release pipe joint 12 and connected thereby to a knee 13. The knee 13 is connected by a connector piece 14 and another knee 15 to a venturi tube 16 that opens into a mixing trough 17 which is mounted at the lower end of the ozonizer 8. Further details will be given below in combination with the description of the other FIGURES. All of the components mounted on the cover plate 7 are connected to the filter housing 1' by the cover plate 7 and may be removed simply therefrom by removing the cover plate. The pipe joint 12 allows to disconnect the feed line in an axial direction so that the mixing trough 17 may be dismantled from the ozonizer 8 together with the 180° tube bend.

A bushing insulator 18 mounted at the other end of the ozonizer 8 serves to supply air for ozonizaton and electrical energy to the ozonizer. Toward this end, an air feed line 19 is connected to the bushing insulator 18 by a pipe joint 20. The air supply has previously been dried in an air drying assembly 21. A high voltage transformer 22 is connected as follows: The secondary winding is connected by one terminal to a shaft portion 23 of a conductor bolt extending through the bushing insulator 18, and by the second terminal to the cover plate 7. The annular disc-shaped outer electrodes of the ozonizer 8 are conductively connected to the cover plate 7 by their mutual contact surfaces. The interior end of the conductor bolt is conductively connected to the inner electrodes which are not shown in FIG. 2. The high voltage transformer 22 may also be mounted directly on the upper surface of the cover plate 7.

The filter star 3 of the filter housing 1' is connected by the line 6 to one port of a servo-controlled three-way valve 24. Another port of the valve is connected by a line 25 to the bath-tub body 100, and the third port of this valve is connected by a line to the feed line 26 connected to the bath-tub on the one hand and to a second servo-controlled three-way valve 27 on the other hand. One of the other two ports of this three-way valve 27 is connected by a line 28 to a waste water conduit. The third port of this valve 27 is connected by the feed line 11 to the filter housing 1'. A pump 29 with a downstream coarse filter is connected in the line 26 between the bath-tub 100 and the valves.

Figure 3:
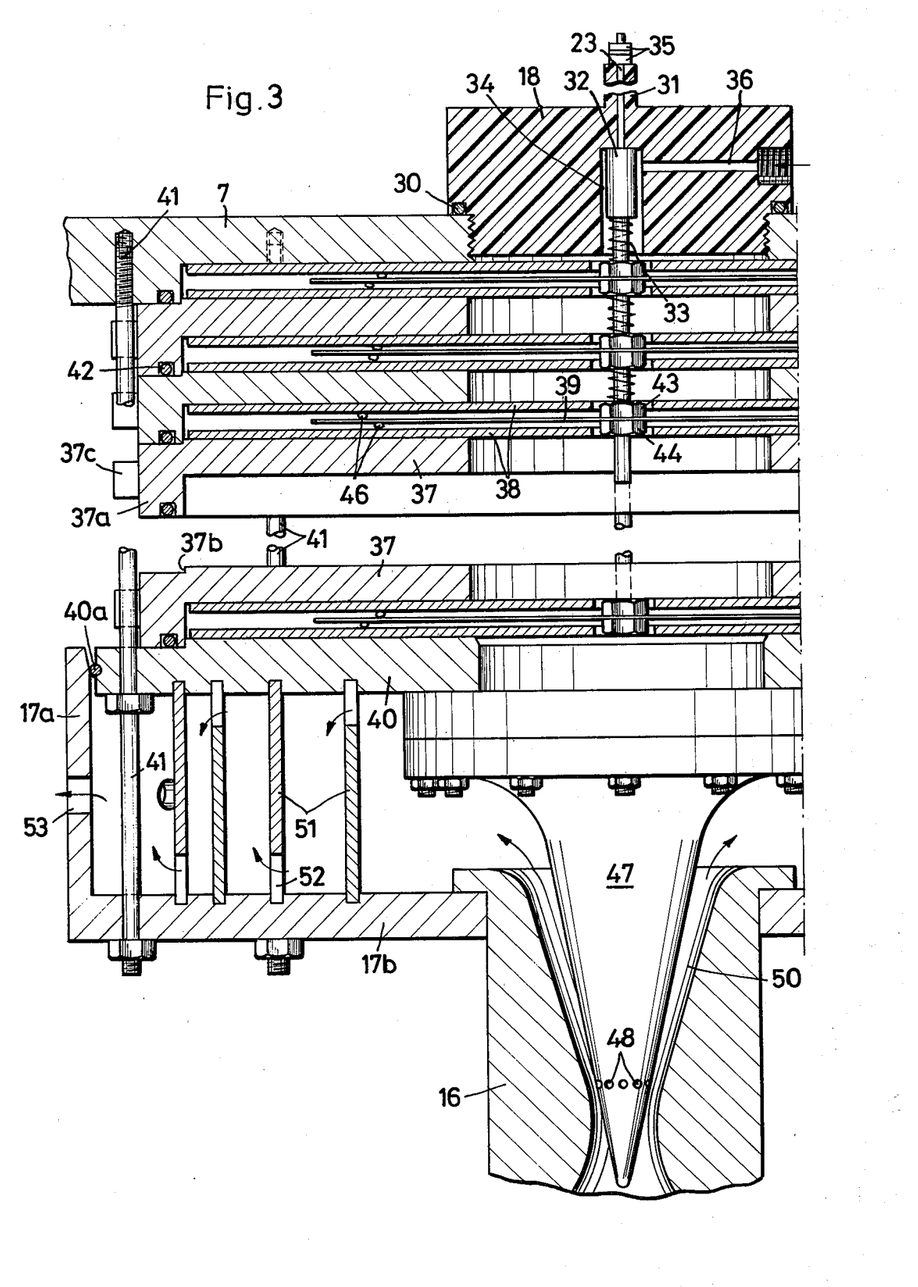
FIG. 3 is a fragmentary longitudinal sectional view of an ozonizer.

In FIG. 3, the ozonizer 8 is shown in approximately natural size. The cover plate 7 is provided with a threaded aperture for screw-mounting the bushing insulator 18. Above its threaded portion, the bushing insulator 18 defines a portion of increased diameter forming an outwardly directed shoulder at which the insulator is sealed against the cover plate 7 by means of an O-ring gasket 30 mounted in a suitable annular groove as shown. At its upper end, the bushing insulator 18 comprises a central cylindrical extension 31 of reduced diameter provided with a bore. A conductor bolt extends through this bore. The conductor bolt comprises the above mentioned thin shaft portion 23, an enlarged diameter intermediate portion 32 and a downwardly projecting pin portion 33. The intermediate portion 32 and a major part of the pin portion 33 are received within an enlarged recess 34 of the central bore through the bushing insulator 18. The upper end of the shaft portion 23 is threaded, and nuts 35 engaging this threaded portion retain the conductor bolt within the insulator and serve as connecting means for the high voltage supply line. A radial bore 36 in the bushing insulator 18 communicates at its inner end with the enlarged recess 34 of the central bore, and is connected at its outer end to a screw socket. By this radial bore 36 air will enter the ozonizer 8.

The outer electrode 37 are solid annular discs made of aluminum. Each disc is provided with a downwardly protruding peripheral rim portion 37a so that relatively flat spaces are defined between the overlying discs. The upper peripheral rim portion of these outer electrodes are recessed downwardly in defining peripheral recesses 37 mating with the lower surface of a downwardly protruding peripheral rim portion 37a of an overlying outer electrode whereby the outer electrodes are automatically centered. For improved cooling efficiency, each outer electrode is provided with a peripheral cooling rib 37c. In each space defined between outer electrodes is arranged a pair of glass plates 38 adjacent the electrode surfaces, and an inner electrode 39 made of stainless steel intermediate the pair of glass plates 38. The cover plate 7 is provided at its inner surface with a corresponding recess for defining a space opposite the adjacent outer electrode 37. The bottom plate 40 is of a somewhat larger diameter and carries at its outer periphery a sealing ring 40a. The outer periphery of the bottom plate 40 contacts the side wall 17a of the mixing trough 17, the bottom wall of which is indicated at 17b.

The described disc members are stacked on top of each other. For tight stacking of these disc members, there are provided eight threaded bolts 41 evenly distributed about the circumference of the discs. The threaded bolts 41 are at their upper ends in screw engegement with corresponding bores in the cover plate 7 and extend in their central portions through radial slots in the ribs 37c the outer electrodes as well as through corresponding bores of the bottom plate 40 and the bottom wall 17b of the mixing trough 17. The lower ends of the threaded bolts 41 are threaded engaged by nuts below the bottom plate 40 and below the bottom wall 17b. The internal cavity of the ozonizer is sealed by sealing rings 42 mounted in grooves and sealing between the outer electrodes 37.

Figures 4, 5:
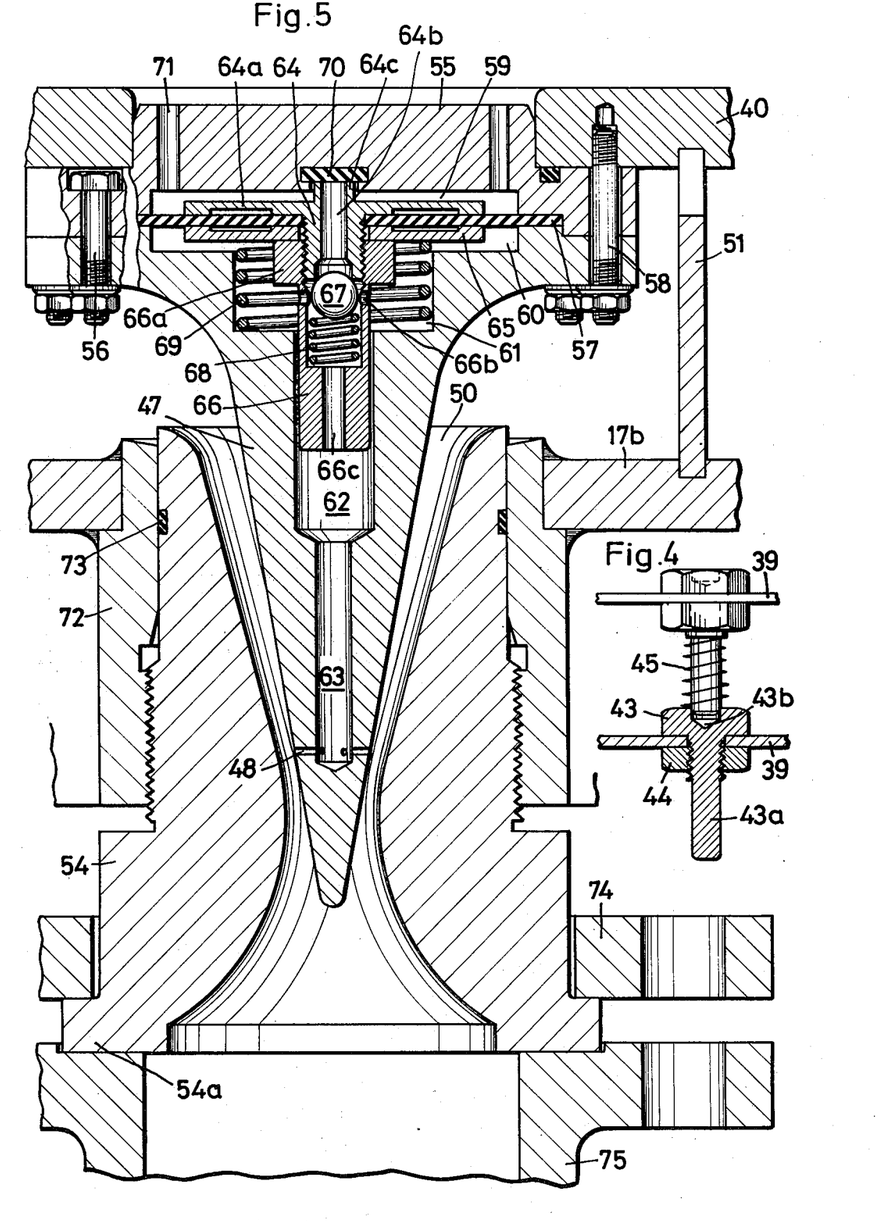
FIG. 4 is an elevational view of plug-and-socket type connector members for electrically connecting and centering the inner electrodes of the ozonizer.
FIG. 5 is a fragmentary longitudinal view of a check valve assembly with associated venturi tube.

FIG. 4 illustrates the electrically conductive connections between the inner electrodes 39, and the centering of inner electrodes and glass plates 38. Each inner electrode 39 includes a central bore into which is mounted a cap screw 43. The cap screw is secured against the electrode by a nut 44. A screw portion extending beyond the nut 44 is devoid of a thread and defines a pin extension 43a that may be inserted into a mating bore 43b within the head end of an abutting screw 43. The pin extensions 43a are surrounded by small coil springs 45 which will be compressed when inserting a pin extension 43a into a mating bore 43b. The pin portion 33 of the conductor bolt engages a mating bore in the cap screw 43 of the uppermost inner electrode 39. The cap screw mounted in the lowermost electrode is not provided with a pin extension. The central bores in the glass plates 38 are of only a slightly larger diameter than the cap screws 43 and nuts 44 so that the inner electrodes 39 will be centered in a sufficiently precise manner.

When assembling the electrodes, several spacers 46 of a plastic material are inserted between the inner electrodes 39 and the glass plates 38 so that these spacers 46 are fairly evenly distributed about the circumference of the glass plates 38. These spacers 46 provide even spacings between these discs, without obstructing radial gas flow. Whereas the outer diameter of the glass plates 38 almost corresponds to the outer diameter of the spacings between the outer electrodes 37, the inner electrodes 39 are of a smaller diameter. This provides the advantage that the gas may flow evenly across the upper edges of the inner electrodes and will be smoothly deflected within the annular spaces surrounding the inner electrodes radially outwardly thereof.

As may be seen in FIG. 3, there is a flow director body 47 screw-mounted to the bottom plate 40 of the ozonizer. The flow director body 47 is cone shaped and flares outwardly into a flange at its upwardly disposed base. FIG. 5 shows a longitudinal sectional view of the flow director body. As may be seen, this body houses a check valve assembly and a nozzle head. The nozzle orifices 48 are disposed in the vicinity of the apex of the cone and serve to discharge the ozone-containing gas. The flow director body 47 is surrounded by the venturi tube 16 forming a terminal member of the water feed line and defining an internal restriction. The venturi tube 16 is mounted within the bottom wall 17b of the mixing trough 17. The annular space 50 defined by the venturi tube 16 and the flow director body 47 increases in cross sectional area from a throat portion toward the interior cavity of the mixing trough 17. Four concentric coaxial cylindrical baffles 51 are mounted between the bottom plate 40 and the bottom wall 17b of the mixing trough. These baffles 51 are alternately provided with several upper and lower marginal cut-outs 52 for permitting radial flow whereby the flow will be redirected several times. The side wall 17a of the mixing trough is provided with several outlet ports 53 for discharging the water gas mixture into the interior cavity of the filter housing 1'. As shown in FIG. 2, the mixing trough 17 supports the flow director body 47 and the venturi tube 16 without the need of any additional support members extending through the annular space 50 and liable to obstruct the flow through this space.

FIG. 5 illustrates constructional details of the check valve assembly and an adjustable venturi tube 54 which is modified with respect to the embodiment shown in FIG. 3. The exteriorly visible parts of the check valve assembly are the flow director body 47 and a clamping disc 54 of the same outer diameter as the flange of the flow director body. These two parts may be made of non-plasticized polyvinyl chloride and interconnected by six bolts 56 with the interposition of an annular diaphragm 57 made of fluorine caoutchouc. The interconnected parts are screw-mounted to the bottom plate 40 by means of six screw bolts 58 engaged by nuts, these bolts being disposed along the same radius as the bolts 56.

The annular diaphragm 57 and the parts mounted thereto which will be described further below may move freely within a pair of mirror shaped cylindrical recesses 59 and 60 in the clamping disc 55 and the flow director body 47 respectively. The lower surface of the recess 60 communicates with another recess 61 of a smaller diameter, and the lower surface of this recess 61 communicates with a guide bore 62 in the flow director body 47. At its lower end, the guide bore 62 is extended by another bore 63 of a still smaller diameter, and adjacent the lower end of this bore 63 there are disposed the three nozzle orifices 48 which extend perpendicularly to the longitudinal axis of the flow director body 47 and enclose mutual angles of 120°.

The most important part of the check valve assembly i.e. the so-called valve member comprises a central portion 62, a flange ring 65, a ball sleeve 66, a ball 67 and a ball biasing spring 68 mounted in the ball sleeve 66, and an another spring 69. The central portion 64 extends through the annular diaphragm 57 and engages by a flange 64a the upper surface of this diaphragm. The central portion 65 includes a center bore 64b and defines at its upper end a projecting orifice portion 64c. The central portion 64 is provided with an external thread engaging a corresponding interior thread of the ball sleeve 66. The upper end of the ball sleeve 66 carries a hexagon head 66a so that the diaphragm 57 may be clamped between the flange 64a and the flange ring 65. The ball sleeve 66 includes four lateral holes 66b and a longitudinal bore 66c and may move freely within the guide bore 62 because of clearance. The ball biasing spring 68 urges the ball 67 toward a valve seat formed at the lower end of the central portion 64. The spring 69 seated in the recess 61 biases the valve member in an upward direction so that the orifice portion 64c will be urged against a closure disc 70 made of fluorine caoutchouc. This closure disc 70 is mounted into the clamping disc 55. Several axially extending inlet bores 71 about a circle of the clamping disc 55 serve as passages for discharging ozone-containing gas from the ozonizer downwardly into the check valve assembly. Because of the aggressive properties of the ozone gas all metal parts must be made of high-alloyed chrome nickel steel.

A short adapter 72 with an internal thread is welded to the bottom wall 17b of the mixing trough concentrically of the flow director body 47, as may be seen in FIG. 5. The venturi tube 54 which may likewise be made of non-plasticized polyvinyl chloride is screw-mounted into the adapter 72 and sealed thereagainst by a sealing ring 73. The venturi tube 54 includes a lower collar portion on which may rest by gravity a flange ring 74. The venturi tube 54 is connected to a water feed line 75 having a flange threadedly connected to the flange ring 74.

The operation of the above described water treating and degerminating assembly is briefly as follows: Thoroughly dried air is supplied by the air feed line 19 and through the radial bore 36 in the bushing insulator 18 into the ozonizer 8 and passes through the enlarged recess 34 of the through-bore into the first discharge space intermediate the uppermost glass plate 38 and the uppermost inner electrode 39. Within this discharge space, the air flows radially outwardly into the annular space between the two uppermost glass plates, i.e. into the space which is disposed as seen in the radial direction outwardly of the uppermost inner electrode. Within this annular space the flow may equalize and different flow rates in circumferential direction may be compensated for if the flow resistance in the discharge space should vary. The air flows from this annular space through the next following discharge space towards the center of the assembly and passes through the apertures in the second and third glass plates 38 into the third discharge space in which the air again flows outwardly. In this manner, the air becomes gradually loaded with ozone and arrives finally at the check valve assembly that is mounted within the flow director body 47 and normally in the open flow position. From the check valve assembly, the ozone-containing gas is discharged through the nozzle orifices 48 into the annular space 50.

In the filtering operation of the treating assembly the water is recycled as follows: The water withdrawn from the bath tub body 100 through the outlet line 26 by the circulating pump 29 enters the three-way valve 27 and is discharged from this valve through the feed line 11, the knee 13, the connector piece 14 and the knee 15 into the venturi tube 16. The nozzle orifices 48 are disposed slightly above the throat portion, i.e. the narrowest cross sectional area. In a non-adjustable venturi tube (as in the embodiment shown in FIG. 3) the nozzle orifices 48 may be spaced from the narrowest cross sectional area by about 1 mm. Due to the negative pressure at this minimum cross section the water readily absorbs the ozone-containing gas in forming a gas water emulsion. The baffles 51 promote further mixing of the components water and gas and enhance turbulence in the water. The ozone thereby reacts with the contaminations in the water. It has been found that this reaction is virtually complete, i.e. that only neglegibly small quantities of reactive ozone are measured at the vent valve 10. The water settles within the filter housing 1' and penetrates the filter layers 2 and will ultimately enter the filter star 3. From the filter star 3 the water is discharged through the feed line 6 to the three-way valve 24 and passes through the line 25 back to the bath tub 100. The contaminations which have been converted into particles that may be retained within the filter by the ozone will be caught within the filter.

For filter backwashing operation the three-way valves 24 and 27 are actuated into a different position so that the water flow is reversed. The water then passes through the line 26 in an opposite direction, passes through the filter housing 1' and the three-way valve 27 and the line 28 to the sewer (not shown). During passage of the water flow, the quartz gravel 2 is loosened up so that the contaminations adhering to the gravel are detached and will be carried away by the water flow. Suitably, the ozone generation is stopped some time before commencing with the backwashing operation. The respective control operations and the actuation of the three-way valves are performed automatically.

The operation of the check valve assembly of FIG. 5 is as follows: In the drawing the two separate valves are shown in the closed position. When starting up the ozonizer and supplying compressed air to the same, this pressure is applied through the inlet bores 71 in the clamping disc 55 to the space defined by the recess 59 aboe the diaphragm 57. When increasing this pressure, the force acting on the diaphragm overcomes the force of the spring 69 so that the valve member is shifted downwardly whereby the orifice portion 64c is lifted away from the closure disc 70.

During this opening movement of the valve member the ball valve assembly 67, 68 remains in the closed position so that the space above the diaphragm remains pressurized. By this fact will be avoided resonant oscillations of the diaphragm which might be caused by continuous variations of the static pressure and corresponding variations of the dynamic pressure of the gas flow within the space 59. This is very important since otherwise the closure disc 70 and the diaphragm 57 would quickly wear out, due to bouncing effects. Not until the pressure has increased to a level under which the flange ring 65 has been moved into its end position engaging the abutment surface of the recess 60, the ball 67 will yield to the applied pressure so that the ozone containing air may be discharged through the center bore 64b and pass through the holes 66b into the recess 61 and from this recess 61 through the clearance between the ball sleeve 66 and the guide bore 62 further downwardly. In a parallel flow path, the gas mixture flows about the outer surface of the ball 67 and passes through the bore 66c downwardly. At the lower end of the flow director body 47 the gas mixture is discharged through the nozzle orifices 48 into the water in an area of maximum negative pressure, and the water will carry away the gas in an upward direction.

The flow resistance of the ball valve assembly 67, 68 for the gas mixture serves to maintain the dynamic pressure of the gas flow above the diaphragm 57 at a level that is sufficient to maintain the valve member in its lower position and to maintain the orifice portion 64c in the open position while the ball itself oscillates, i.e. moves upwardly and downwardly. If there should occur a sudden pressure drop within the ozonizer the ball valve immediately moves into its closing position. If due to the oscillations of the ball some drops of water should have entered the valve, these drops of water will not be of any harm because the orifice portion 64c engages slightly thereafter the closure disc 70, under the full force of the spring 69. The force exerted by this spring is assisted by the water pressure acting on the diaphragm from below.

On the other hand, the negative pressure existing at the nozzle orifices 48 assists the opening of the valves. This effect may be utilized to permit opening of the check valve assembly only during water flow conditions. Toward this end, the compressor (not shown) for supplying compressed air to the ozonizer 8 may not supply more than a predetermined maximum pressure, or a relief valve must be connected at the input of the ozonizer.

The invention is not intended to be restricted to the above described embodiments as shown in the appended drawings. It is considered to be within the scope of the present invention to employ modified types of filters and a different arrangement of the ozonizer as well as to arrange these in a different manner within the cabinet. The filter housing containing the ozonizer may of course likewise be releasably connected such as e.g. by flange connectors to the bath tub body. Instead of bromine or hydrobromic acid respectively the filter may likewise be charged with iodine or suitable iodine compounds, or any other suitable compound producing similar effects.

What is claimed is:

1. A process for purifying bath water containing the organism bact. pseudomonas pyocanea comprising charging the water to be purified with ozone produced by an ozone generator and then filtering the ozone containing bath water with a first filter layer of fine grain activated charcoal and then filtering the thus filtered water with a second filter of a mixture of filter gravel and mineralized charcoal, both the first and second filters having been charged with bromine or hydrobromic acid, said bath water, before purification, being used as a coolant for said ozone generator.

* * * * *